United States Patent [19]

Turner et al.

[11] Patent Number: 5,056,147
[45] Date of Patent: Oct. 8, 1991

[54] RECOGNITION PROCEDURE AND AN APPARATUS FOR CARRYING OUT THE RECOGNITION PROCEDURE

[75] Inventors: Stephen J. Turner, Saffron Walden; John B. Lilley, Brentwood, both of England

[73] Assignee: Products From Ideas Ltd., Basildon, England

[21] Appl. No.: 520,195

[22] Filed: May 9, 1990

[30] Foreign Application Priority Data

May 16, 1989 [GB] United Kingdom ............... 8911130
Jun. 13, 1989 [GB] United Kingdom ............... 8913522
Jun. 13, 1989 [GB] United Kingdom ............... 8913523

[51] Int. Cl.$^5$ .............................................. G06K 9/00
[52] U.S. Cl. ......................................... 382/14; 382/18
[58] Field of Search ...................... 382/18, 20, 49, 42, 382/14

[56] References Cited

U.S. PATENT DOCUMENTS

| | | | |
|---|---|---|---|
| 3,382,482 | 5/1968 | Greenly | 382/18 |
| 3,639,902 | 2/1972 | Dietrich | 382/20 |
| 3,652,991 | 3/1972 | Dietrich | 382/20 |
| 3,868,635 | 2/1975 | Shah et al. | 382/18 |

FOREIGN PATENT DOCUMENTS

| | | |
|---|---|---|
| 0251504 | 1/1988 | European Pat. Off. |
| 2112194 | 7/1983 | United Kingdom ............... 382/49 |
| 1605262 | 12/1985 | United Kingdom ............... 382/42 |

OTHER PUBLICATIONS

"Guide to Pattern Recognition Using Random-Access Memories," I. Aleksander, Computers and Digital Techniques, Feb. 1979, vol. 2, No. 1, pp. 29-40.

Primary Examiner—Leo H. Boudreau
Attorney, Agent, or Firm—Nixon & Vanderhye

[57] ABSTRACT

Apparatus and methods are disclosed for recognizing patterns, i.e., comparing a stored pattern with a pattern to be measured. The apparatus is taught a stored or reference pattern by assigning a first binary value to each of a plurality of addressable data stores at locations selected by applying respective sets of values to the stores, the values representing characteristics of the stored pattern. A second binary value is assigned to all locations not selected. The pattern to be measured has sets of values representing characteristics thereof applied to respective addresses of the addressable data stores. The contents of the selected addresses are read and the binary values from the selected addresses are applied to a network capable of providing an output signal representing a selected binary value only when the first binary value is read from all selected locations. The output signal represents the result of the measurement and may provide a measure of the closeness of the stored and observed patterns.

18 Claims, 12 Drawing Sheets

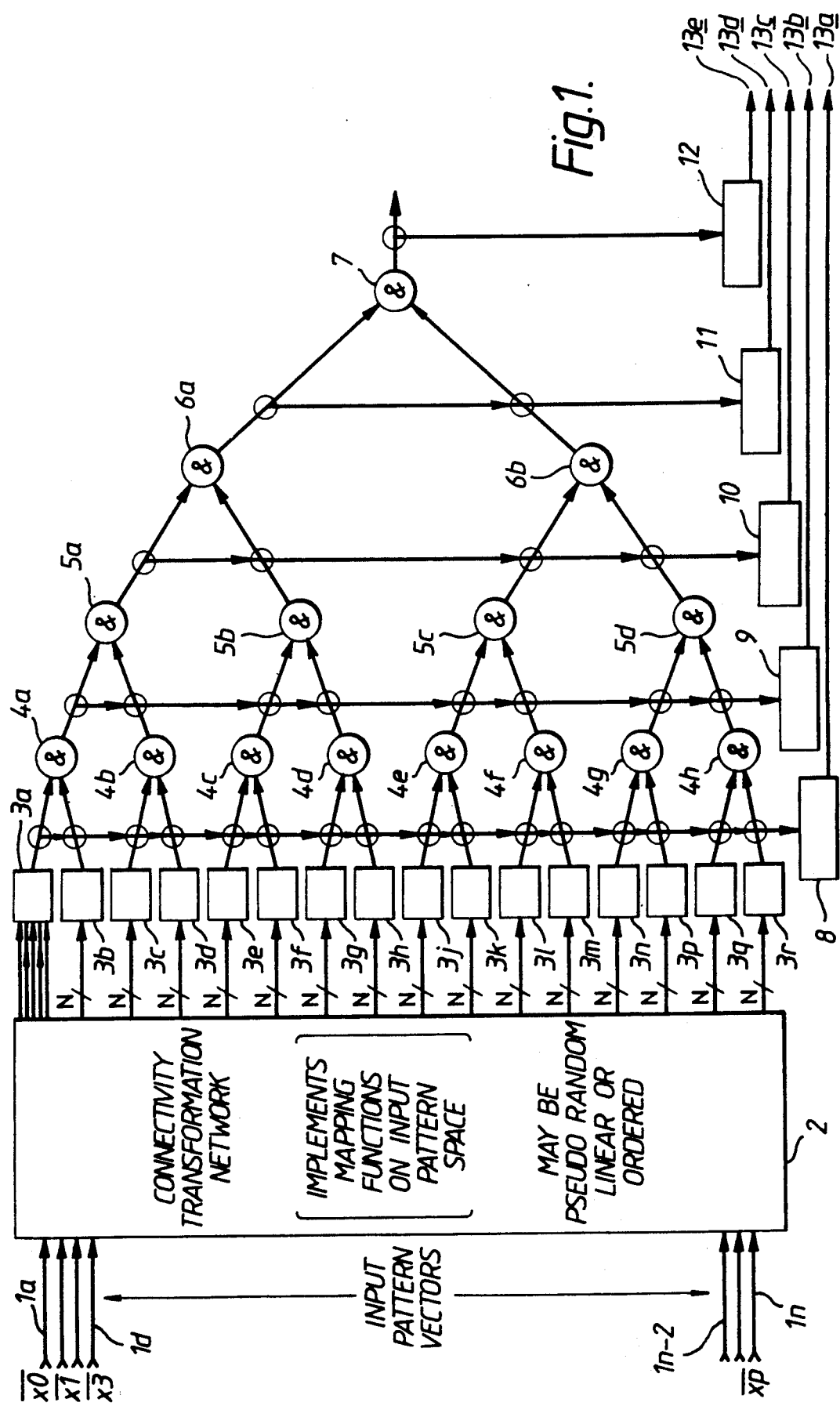

RECOGNITION PROCEDURE AND AN APPARATUS FOR CARRYING OUT THE RECOGNITION PROCEDURE

The present invention relates to a recognition procedure by means of which a machine may be made to recognise a pattern, and an apparatus for carrying out the recognition procedure.

An important requirement of a machine-based system may be that it should be capable of recognising patterns, such as for example, patterns that are visual or aural, as sensed by a human being, or patterns which cannot be sensed by a human being but nevertheless represent useful information.

A cash dispensing machine is an example of a machine which may be required to recognise a pattern where, for example, the machine is required to identify a card presented to it as belonging to an authorised user. Another type of machine that must be capable of pattern recognition is one for controlling entry to a secure area.

The usual manner of operating a machine-based system that is capable of pattern recognition is to first "teach" the machine by causing it to store data representing a pattern that the machine will be required to recognise, and then causing the machine to compare its stored data with input data, representing a pattern under consideration, and to measure the pattern under consideration against the pattern which it has been "taught". The data presented to the machine is usually in digital form and that data presented when the machine is being "taught" is usually stored in a digital data memory in the machine.

It will be appreciated that the manner in which the data is organised in storage in the machine when the machine is being "taught" and the manner of comparison of the stored data with input-data when the machine is making its measurement, that is the recognition procedure, influence significantly the quality of the machine measurement and the time taken to make that measurement.

It is an object of the present invention to provide a hitherto unused recognition procedure for a machine-based recognition system and an apparatus for carrying out the recognition procedure.

In accordance with the present invention, a recognition procedure includes the steps of teaching a reference pattern to a machine-based recognition system by writing a first binary value to each of a plurality of addressable data stores at locations selected by applying respective sets of values to the addressable data stores, where the sets of values represent characteristics of the reference pattern, writing a second binary value to all locations not selected in the addressable data stores, and of measureing another pattern against the reference pattern by applying sets of values representing characteristics of the other pattern to respective addresses of the addressable data stores, reading the contents of those addresses selected, and applying the binary values read from the selected addresses to a network that is capable of providing an output signal representing a selected binary value as its output only when the first binary value is read from all of the selected locations, where the output signal represents the result of the measurement.

The first binary value is, preferably, a logical 1, and the selected binary value is, preferably, a logical 1, but it will be understood by those skilled in the art that a logical 0 may be used as the first binary value and also as the selected binary value, and adjustments made, where necessary, to provide results consistent with those obtained when a logical 1 is used as either or both values.

Preferably, the first binary value is a logical 1, and the network for providing the output signal representing the selected binary value is a network of logical AND gates in which case the selected binary value is also a logical 1.

The function performed by a network of logical AND gate may be executed by means of a logic element capable of performing the AND function on values presented to it, associated latches for storing respective input and output values for the logic element, and counters for controlling the grouping, and circulation, of successive input and output values, through the logic element, in group sizes, and for a number of times, as set by initial settings of the counters.

The recognition procedure may include the steps of forming a sum of the total number of times that the first binary value is read from the addressable data stores during the measuring of the other pattern against the reference pattern, and taking that total number into account in providing an output signal indicating the result of the measurement.

Thus, if, for example, there are 1000 addressable data stores carrying the first binary value, then the first binary value should be read from the addressable data stores 1000 times for a measuring network to provide a signal indicating that the patterns are the same, while the indication will be that the patterns are different in the case where the first binary value is read from the addressable data stores 999 times instead of 1000 times, and the step of forming the sum of the total number of times that the first binary value is read from the addressable data stores will provide a measure of how close two patterns are to each other.

The recognition procedure may include the step of putting the values representing characteristics of the reference pattern into sets for application to the addressable data stores. The step of putting the values into sets may be equivalent to data encoding, and may be referred to as pseudo random, linear, or ordered encoding.

The recognition procedure may include the steps of forming further sums of the total number of occurrences of the first binary value at selected positions within the network and taking those further sums into account in providing an output signal indicating the result of the measurement.

Where the values representing characteristics of a reference pattern are encoded for application to the addressable data stores, the encoding algorithm may be different for each reference pattern.

A reference pattern may relate to a human face.

Alternatively, a reference pattern may relate to other biological and/or physical characteristics, of a person, which are unique to that person, and by which that person may be identified.

A determination of personal identifying characteristics, which may be referred to as "making a biometric determination", would involve ascertaining, for example by measurement, characteristics of face, voice, or aroma, or hand, palm, or finger prints The resulting data may be recorded in an easily portable form.

The biometric determination, and the means for carrying it out, may employ, for example, optical, acoustic, olfactory, pressure, or electromagnetic sensing.

The recognition procedure may be used in a method of identification which comprises making a biometric determination of a person to be identified and forming a pattern from the determimation, reading a machine-readable data carrier having a reference pattern made from the same biometric determination of a person, comparing the two patterns, and indicating the identity or otherwise of the two patterns.

An apparatus for performing a recognition procedure would, of course, be required to employ a recognition technique which is consistent with that used in performing the biometric determination which provided the pattern which is under scrutiny Apparatus for carrying out a recognition procedure in which a reference pattern is memorised and a pattern to be examined is compared with the reference pattern, includes:

a plurality of addressable data stores each having address ports, data input and output ports, and a read/write control port, input means for receiving input values representing characteristics of a pattern to be memorised or examined and for presenting the input values as a plurality of sets of values to the address ports of respective ones of the addressable data stores, and, a network of logic elements connected to the data output ports of the addressable data stores, the network being capable of providing a selected binary value as its output only when the first binary value is provided by all of the data output ports of the addressable data stores, the apparatus being operable, when a pattern is being memorised, to load one address of each addressable data store with a first binary value and to load all other addresses with a second binary value, where the addresses that receive the first binary value are selected by the input values representing the characteristics of the pattern being memorised, and, when a pattern is being examined, to read the contents of one address of each addressable data store, where the addresses that are read are selected by the input values representing the characteristics of the pattern being examined, to apply the data read from the addressable data store to the network of logic elements, and, to provide an output signal from the network of logic elements.

Preferably, the the logic network consists of a cascade of groups of AND gates, in which the number of AND gates in each group is half the number of AND gates in the immediately preceding group.

Alternatively, the logic network may include a logic element capable of performing the AND function on values presented to it, associated latches for storing respective input and output values for the logic element, and counters for controlling the grouping, and circulation, of successive input and output values, in group sizes, and for a number of times, as set by the initial settings of the counters.

The apparatus may include a summation means for forming a sum of the total number of times that the first binary value is read from the addressable data stores during the examination of a pattern.

There may be a first summation means connected to the data output ports of the addressable data stores, and there may be further summation means connected to selected groups of logic elements in the network of AND gates for forming further totals of the number of times the first binary value appears at selected parts of the logic network.

The input means may be capable of encoding the input values for application to the addresses of the addressable data stores, and the apparatus may be capable of changing its encoding algorithm.

An apparatus in accordance with the present invention may be used as an identification apparatus, and may comprise means for making a biometric determination, means for encoding the determination, means for reading a machinereadable data carrier, means for comparing data read by the reading means with the encoded biometric determination, and means for indicating the identity or otherwise of the data and the encoded determination.

An apparatus in accordance with the present invention may produce a machine-readable data carrier, and may comprise means for making a biometric determination, means for encoding the biometric determination, and means for applying encoded data corresponding to the biometric determination to a machine-readable data carrier.

The data carrier is, advantageously, one containing a memory and means for interactive processing, that is, a "smart" data carrier, capable of storing a biometric determination. The storage may be electrical or optical.

Advantageously, the carrier would carry the interpretive strategies for the decoding of the data.

A carrier contains the encoded determination of only one person so that, when used with the apparatus of the invention, recourse to a database containing such determinations is unnecessary.

The carrier is suitably readily portable and robust, for example, a card.

A recognition procedure, in accordance with the present invention, and apparatus for performing the recognition procedure, will now be described by way of example only, with reference to the accompanying drawings, in which:

FIG. 1 represents a first apparatus for carrying out the recognition procedure,

Figure 2A:
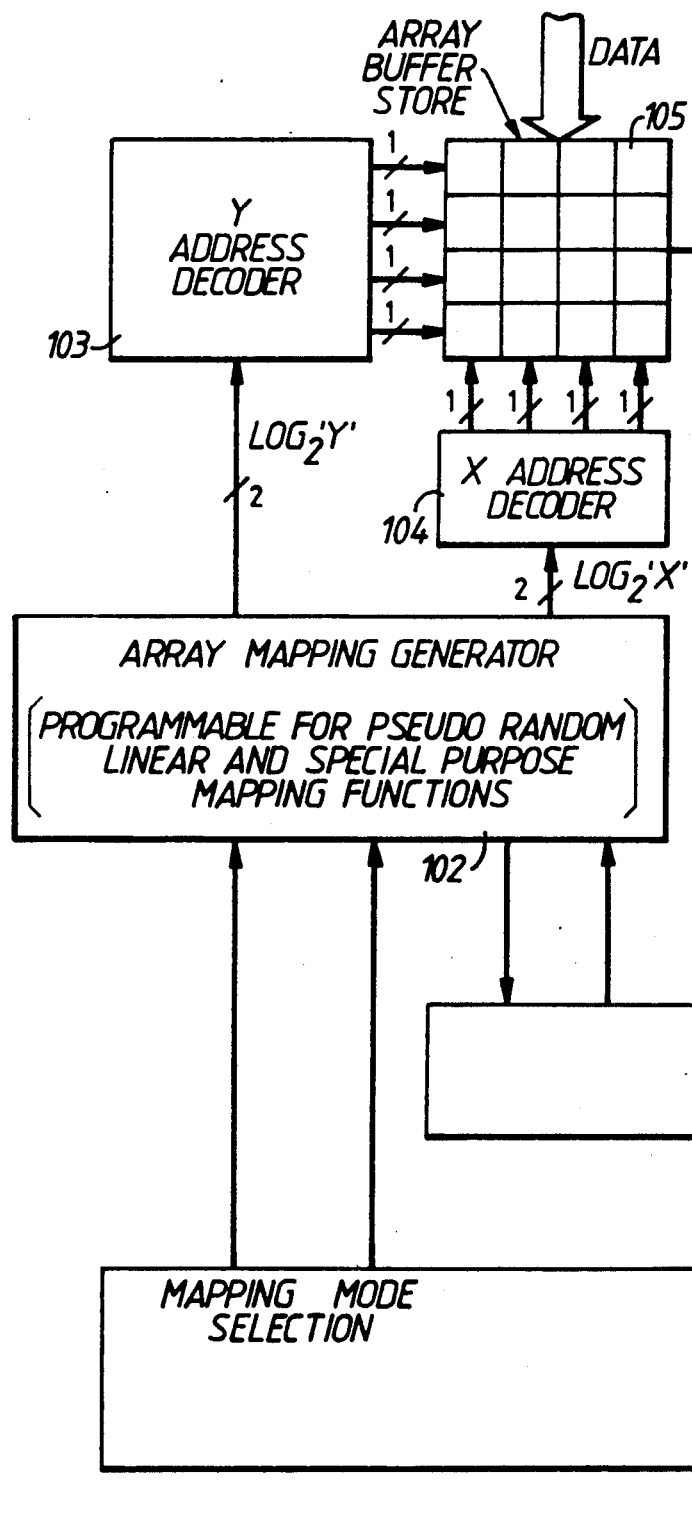
FIG. 2 represents a second apparatus for carrying out the procedure.
Figure 2B:
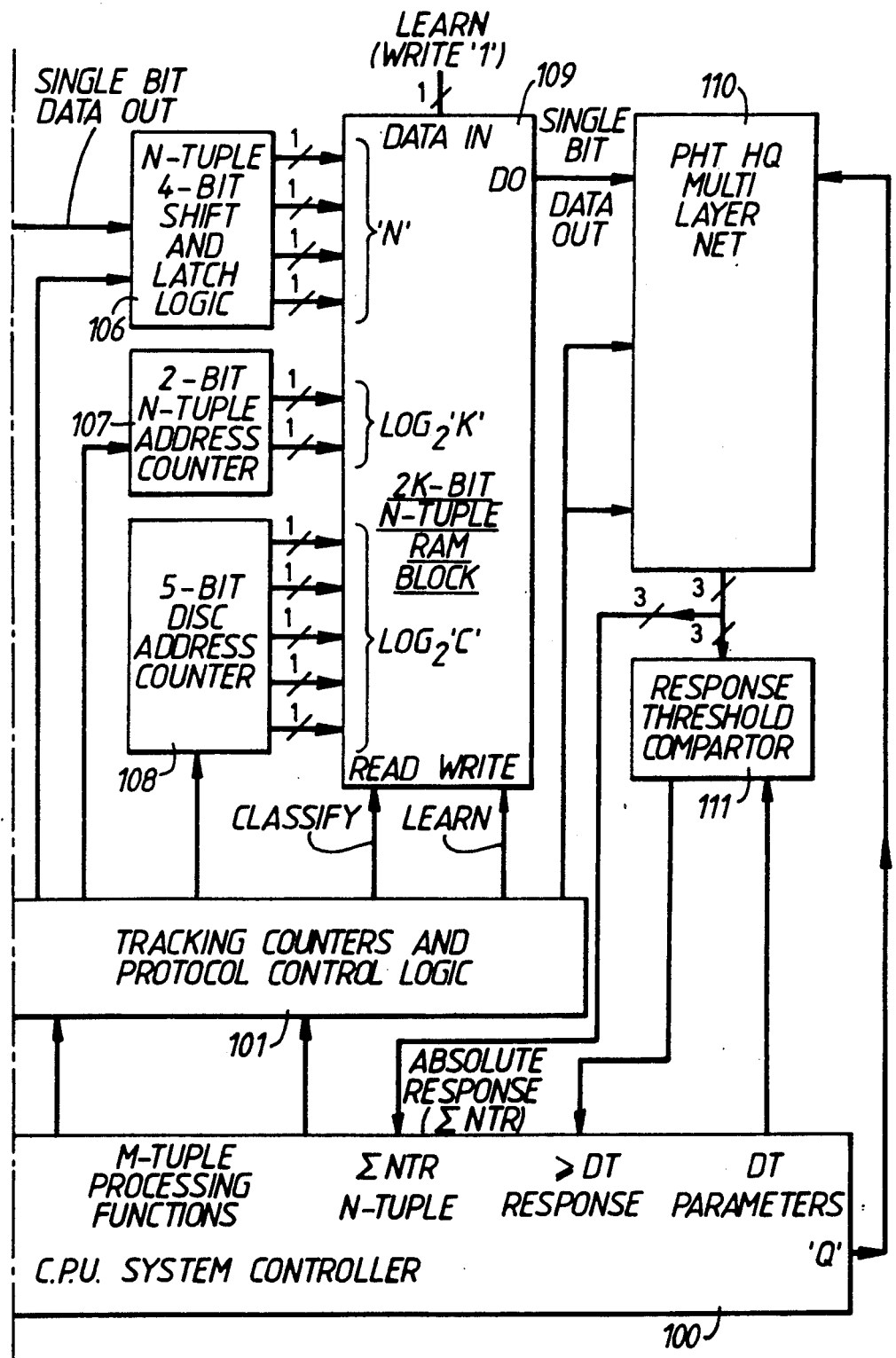
Figure 3:
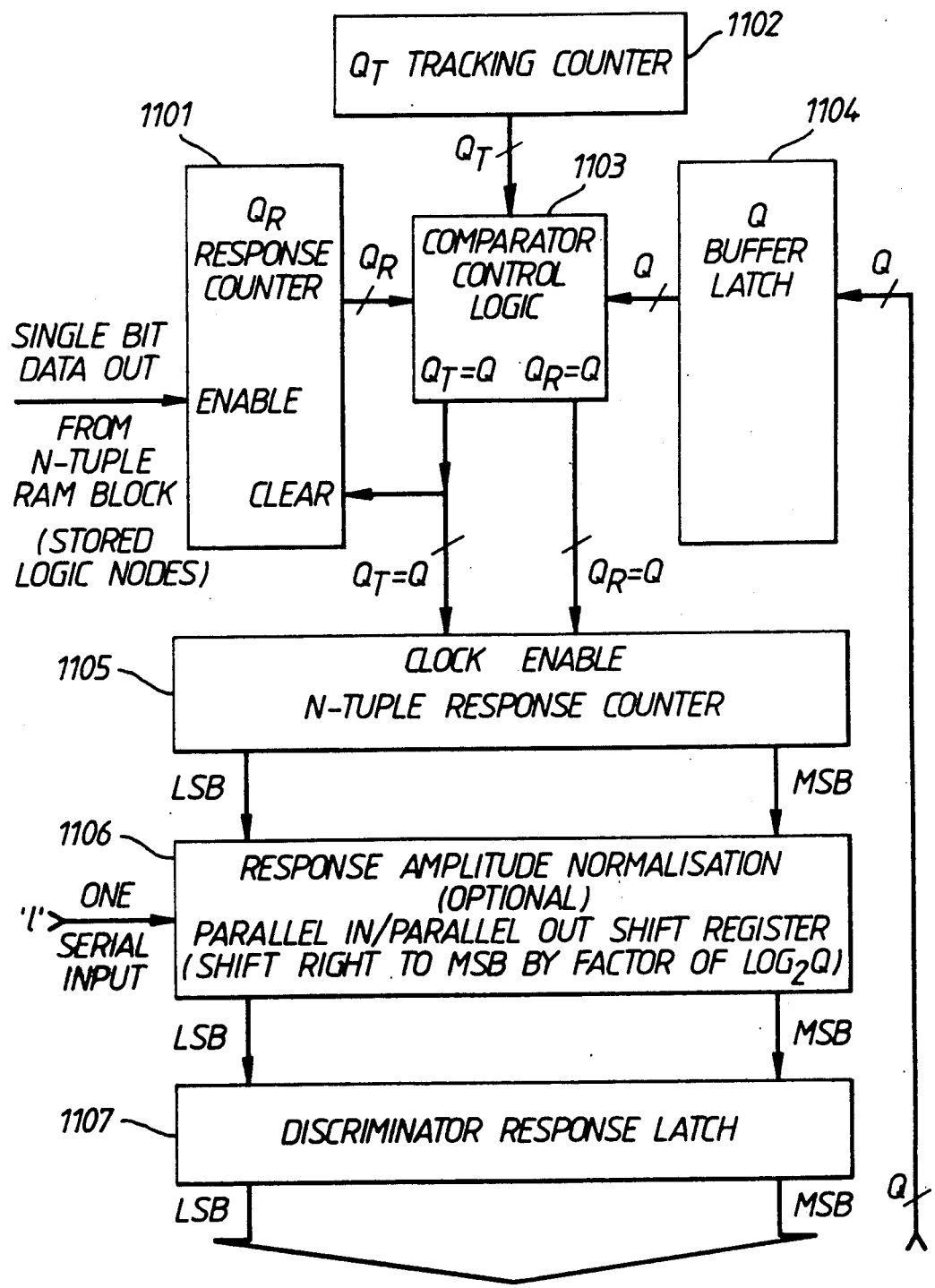
Figure 4A:
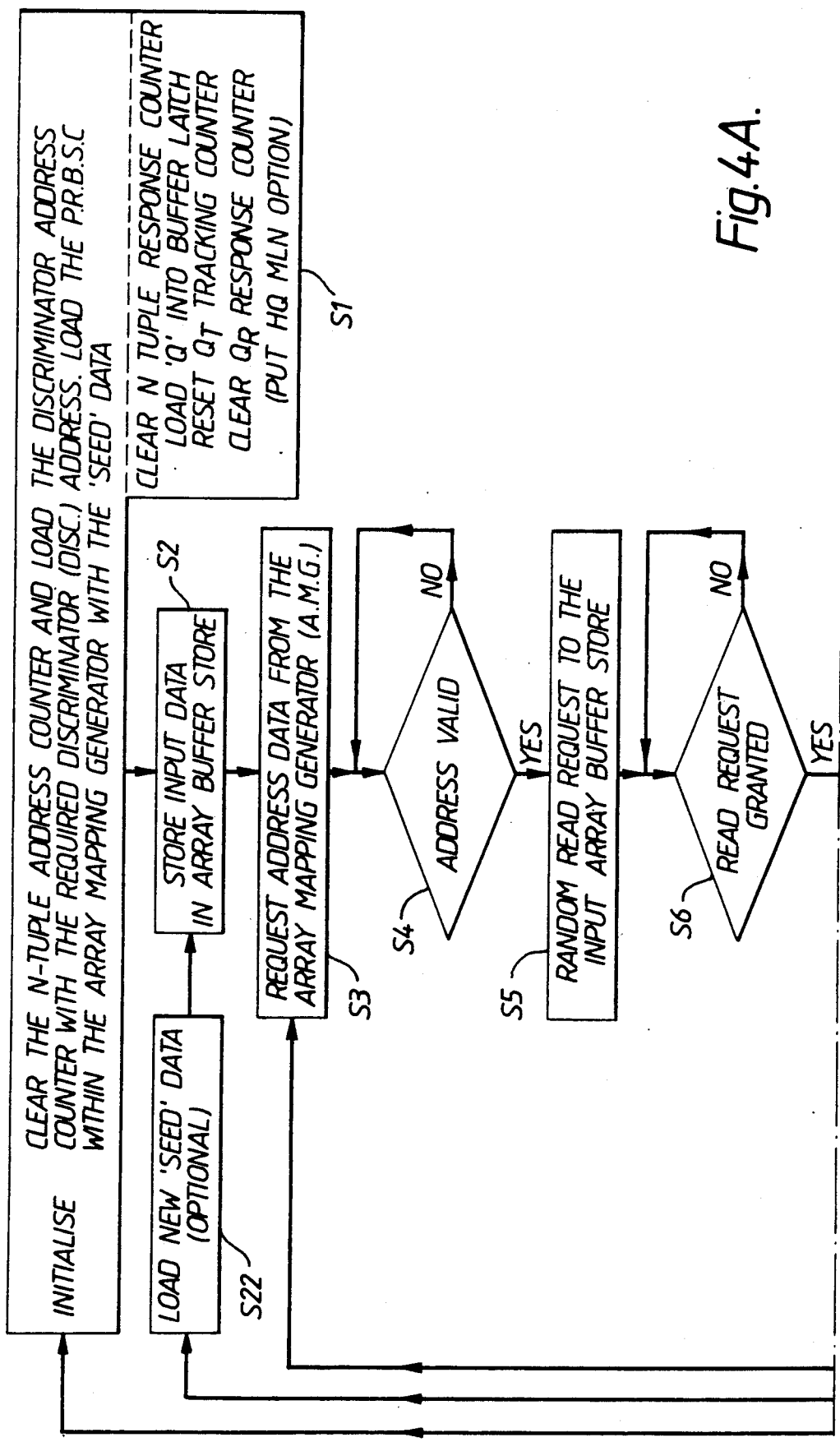
Figure 4B:
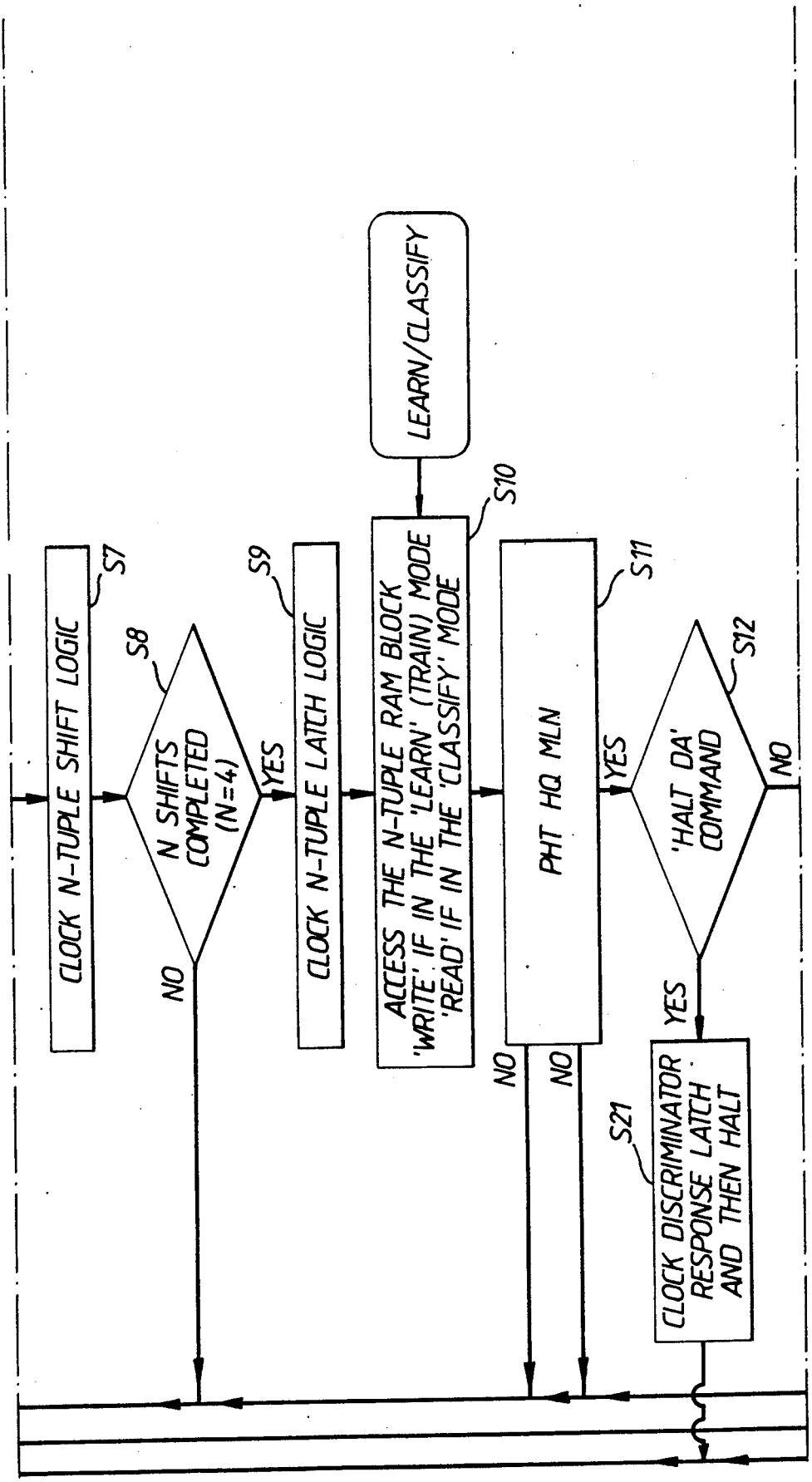
Figure 4C:
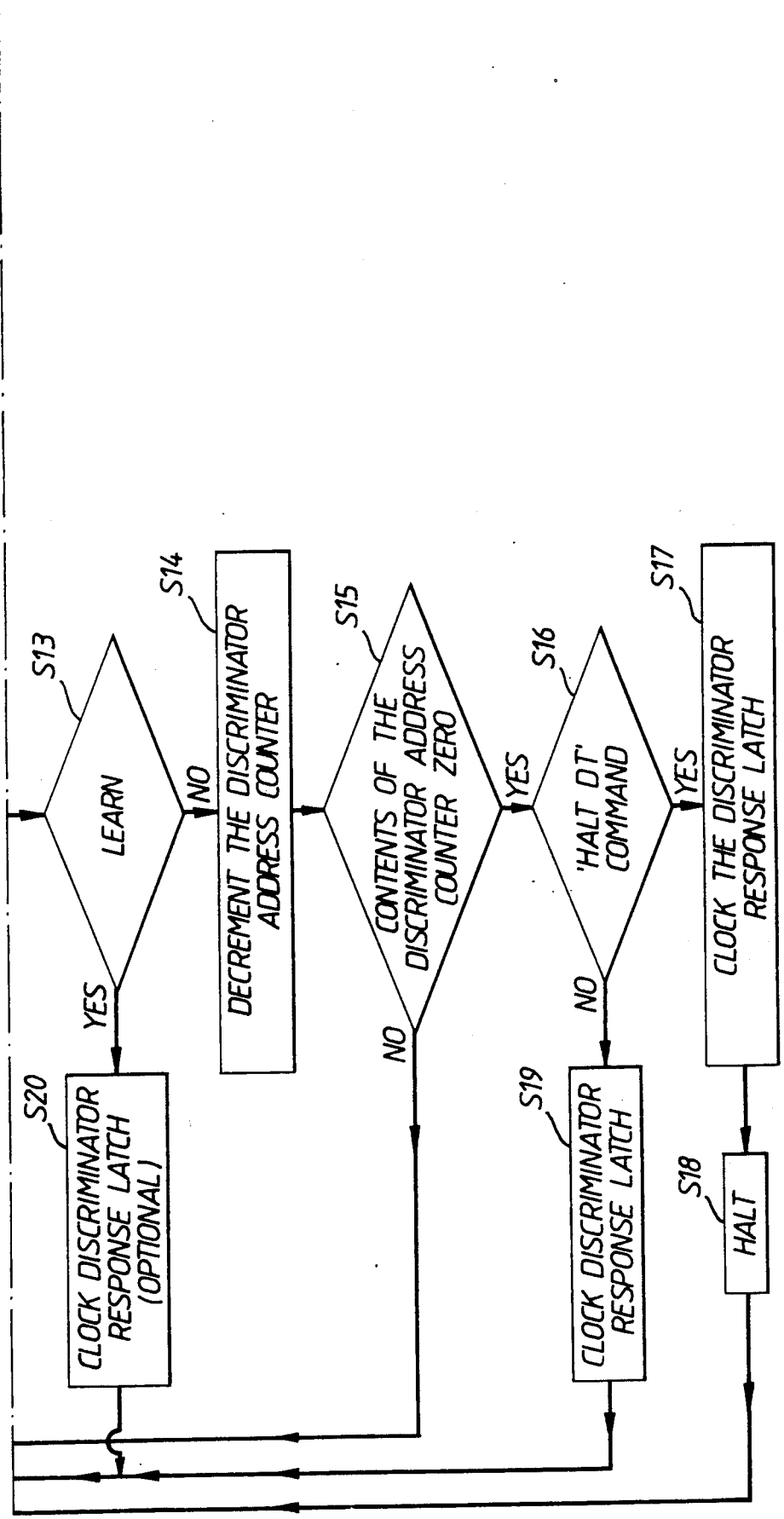
Figure 5A:
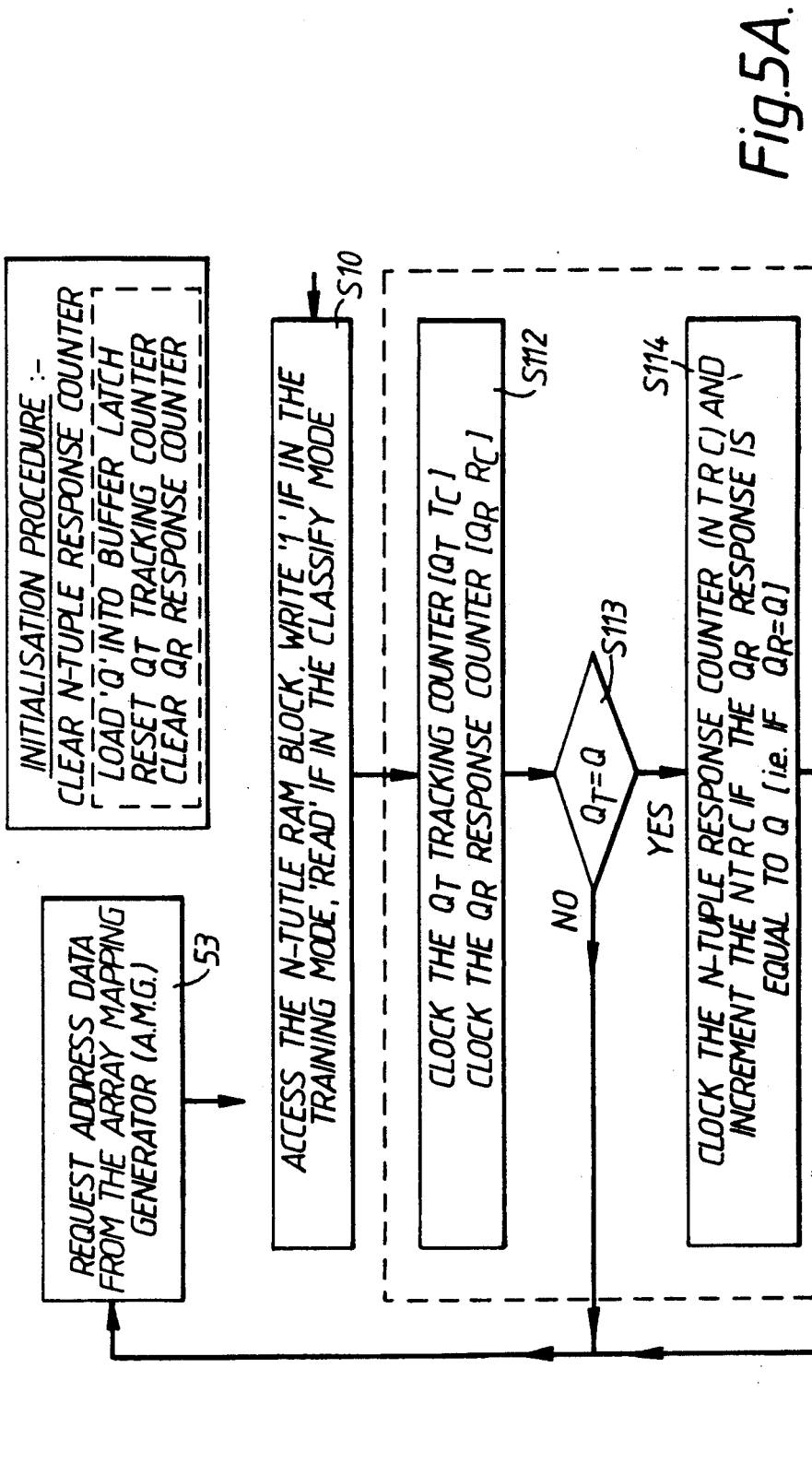
Figure 5B:
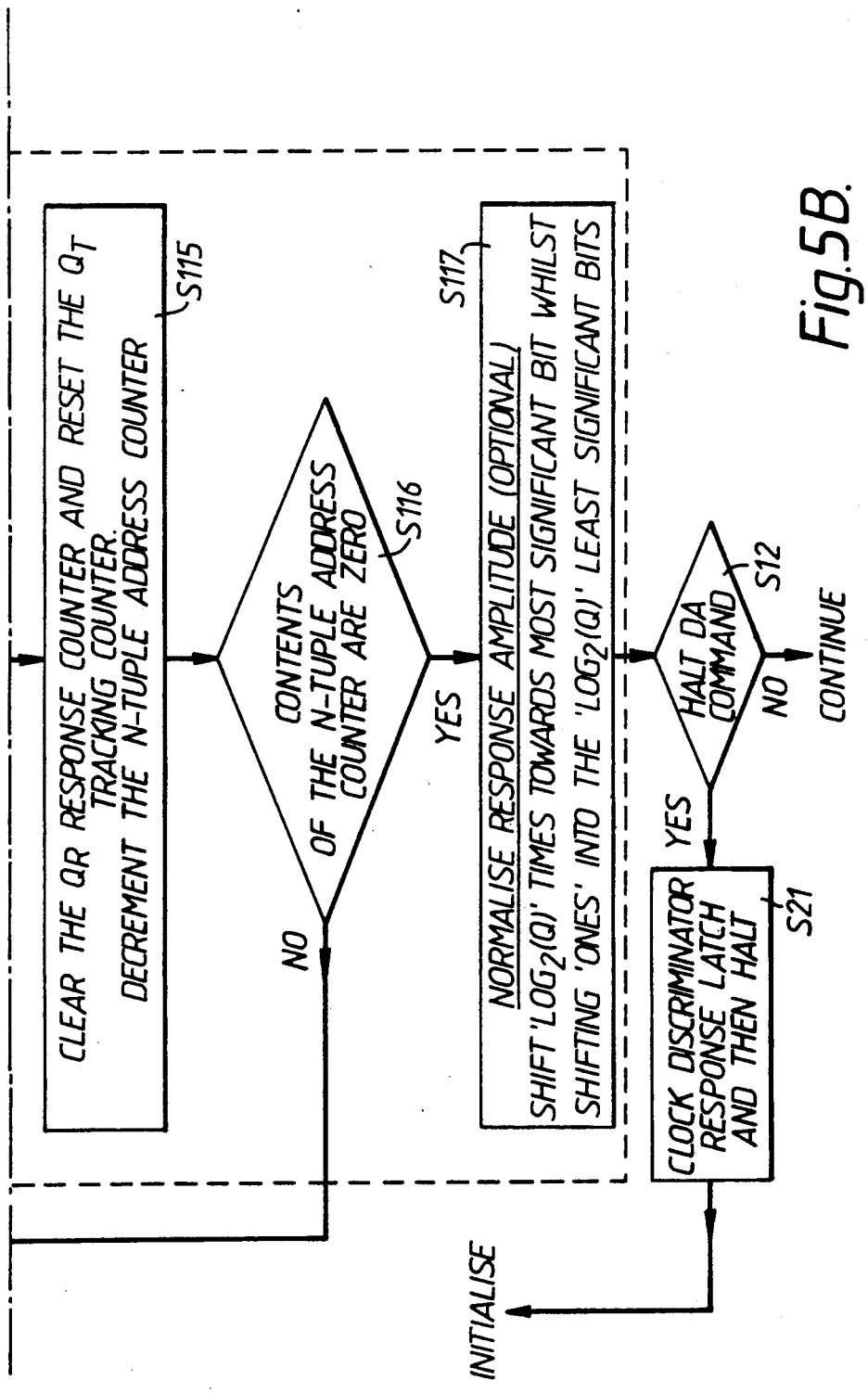
Figure 6A:
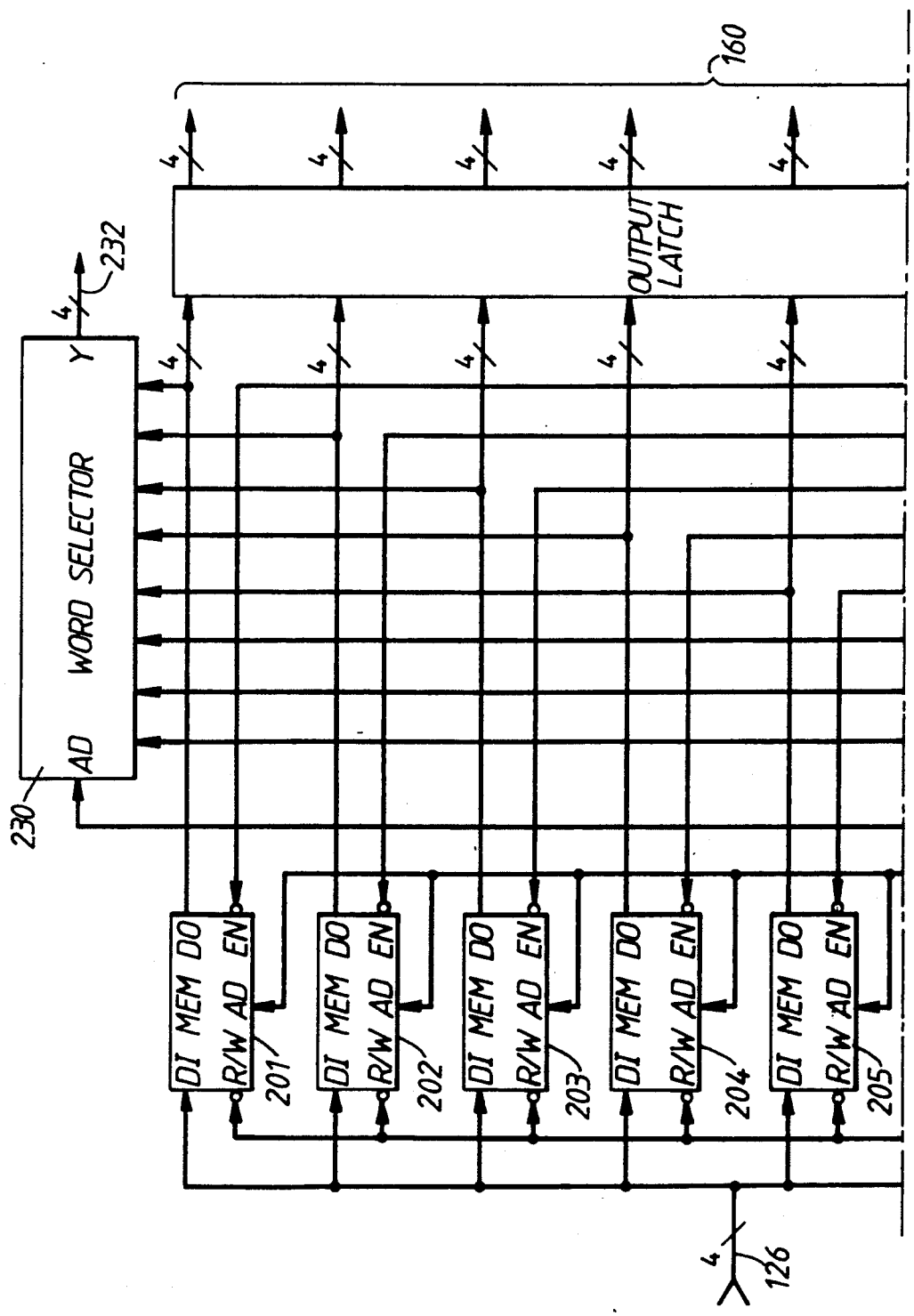
Figure 6B:
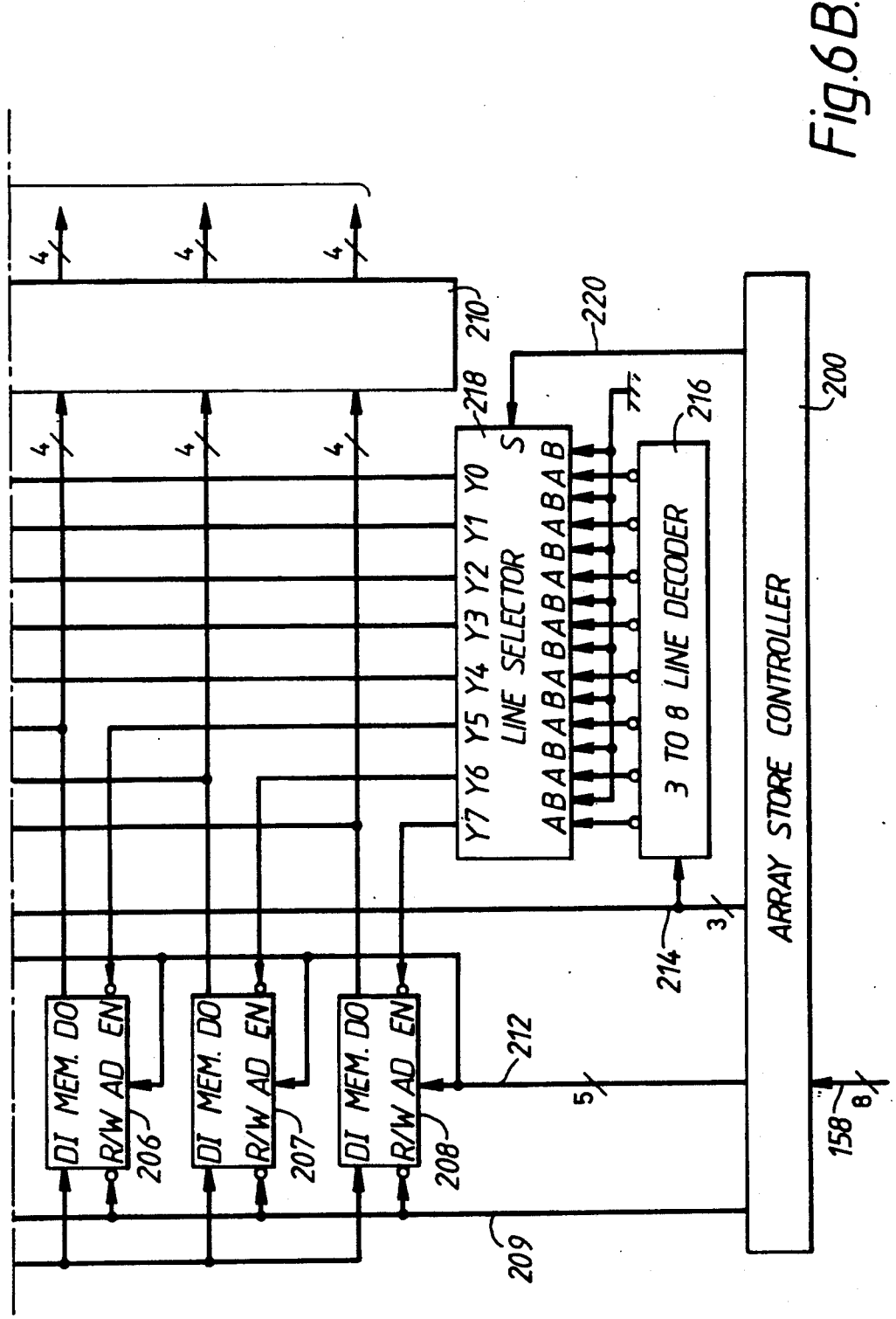
Figure 7:
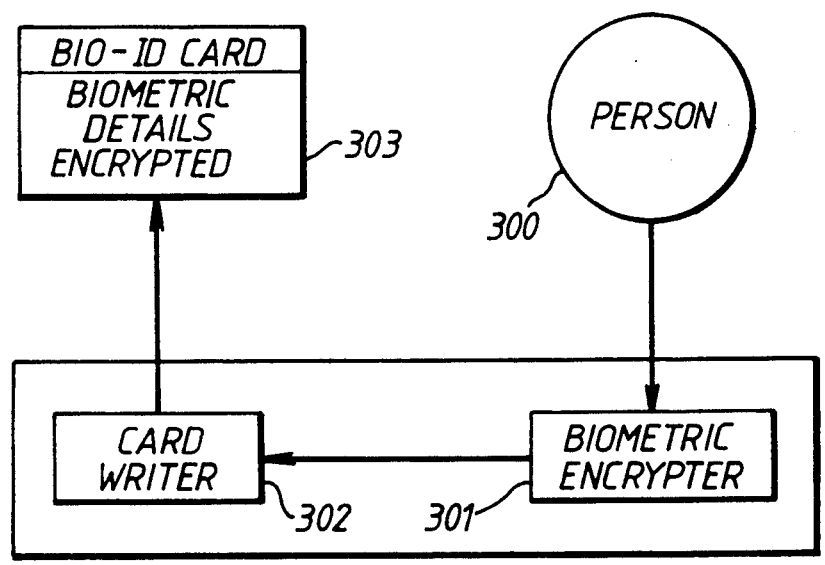
Figure 8:
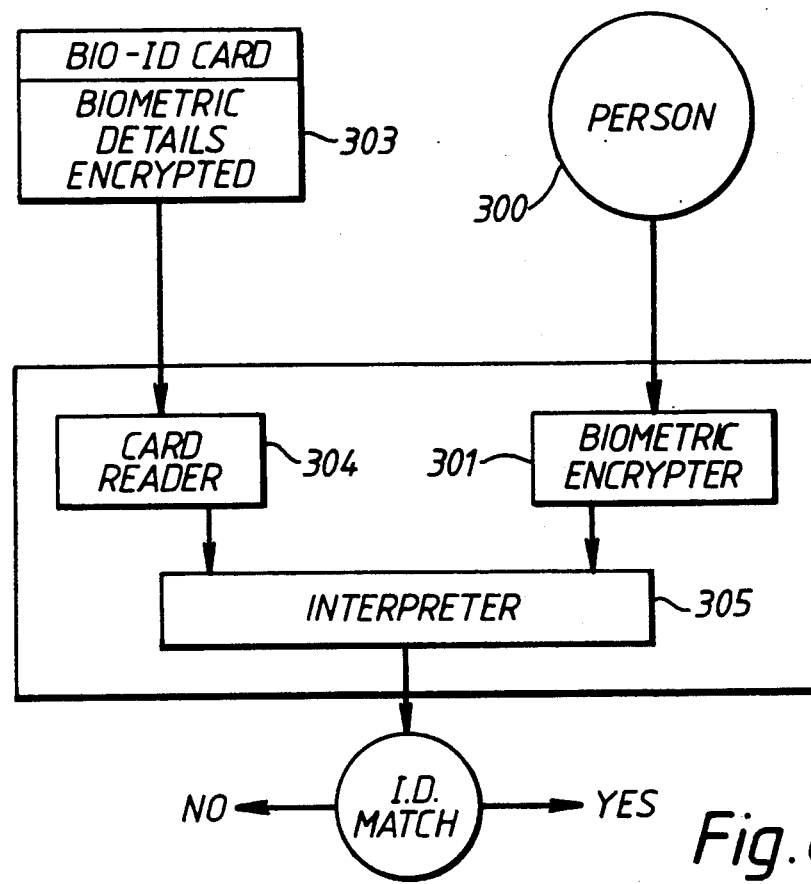

FIG. 3 is a more detailed representation of a part of FIG. 2, detail than is shown in FIG. 2, FIG. 4 is a flow chart representation of the operation of the apparatus represented by FIG. 2, FIG. 5 is a more detailed flow chart representation of of a part of FIG. 4, 4, FIG. 6 is a block diagram representation of an alternative arrangement for a part of FIG. 2, FIG. 7 represents the apparatus of FIG. 1 or FIG. 2 in a "learn" mode, and, FIG. 8 represents the apparatus of FIG. 1 or FIG. 2 carrying out a recognition procedure.

Referring to FIG. 1 of the accompanying drawings, an apparatus for carrying out the recognition procedure includes a connection network 2, a plurality of storage blocks 3a, to 3r, a network of logic blocks 4a, to 4h, 5a to 5d, 6a, 6b, and 7, and several summing networks 8, 9, 10, 11, and 12, connected together.

The connection network 2 has n input ports 1a to 1n and a plurality of output ports. Groups of the output ports of the connection network 2 are connected to respective ones of the storage blocks 3a to 3r. The output ports of the first pair of storage blocks 3a 3b are connected to respective input ports of the logic block 4a, the output ports of the second pair of storage blocks 3c and 3d are connected to respective input ports of the logic block 4b, and so on until, finally, the output ports of the last pair of storage blocks 3q and 3r are connected to respective input ports of the logic block 4h. The output ports of the logic blocks 4a and 4b are connected to respective input ports of the logic block 5a, the output ports of the logic blocks 4c and 4d are connected to respective input ports of the logic block 5b, and so on until, finally, the output ports of the logic locks 4g and 4h are connected to respective input ports of the logic block 5d. The network of logic blocks is continued y having the output ports of the logic blocks 5a and 5b connected to respective input ports of the logic block 6a and the output ports of the logic blocks 5c and 5d connected to respective input ports of the logic block 6b. The network of logic blocks is terminated by the logic block 7 which has respective input ports connected to the output ports of the logic blocks 6a and 6b.

It will be evident from the manner of interconnection of the storage blocks 3a to 3r and of the logic blocks 4a to 4h, 5a to 5d, 6a, 6b and 7, that there are twice as many storage blocks 3a to 3r as there are logic blocks 4a to 4h, that there are twice as many logic blocks 4a to 4h as there are logic blocks 5a to 5d, and so on until, finally, the logic network terminates in a single logic block such as the logic block 7.

The interconnection between the storage block 3a and the connection network 2 is such that, where there are s connection lines from the connection network 2 to the storage block 3a, then there are $2^s$ storage locations provided in the storage block 3a. The s connection lines from the connection network 2 to the storage block 3a are address lines of the storage block 3a which is an addressable data store. There are also further respective groups of s connection lines between each of the storage blocks 3b to 3r and the connection network 2 and each further group of s connection lines are address lines for the respective storage block which also has $2^s$ storage locations.

The summation network 8 is so connected to each of the output ports of the storage blocks 3a to 3r that the summation network 8 receives an input signal from each of the output ports of the storage blocks 3a to 3r, and the summation network 8 provides an output signal that represents the total number of logical 1 signals generated by all of the storage blocks 3a to 3r.

The summation network 9 is connected to the logic blocks 4a to 4h in a manner similar to that in which the summation network 8 is connected to the storage blocks 3a to 3r, and the summation network 9 provides an output signal that represents the total number of logical 1 signals generated by all of the logic blocks 4a to 4h.

The summation network 10 and the summation network 11 are so connected to the logic blocks 5a to 5d and the logic blocks 6a and 6b, respectively, that the summation network 10 provides an output signal that represents the total number of logical 1 signals generated by all of the logic blocks 5a to 5d and the summation network 11 provides an output signal that represents the total number of logical 1 signals generated by the logic blocks 6a and 6b.

The summation network 12 is connected to the output port of the logic block 7 and provides an output signal that indicates whether the logic block 7 has generated a single logical 1 signal or no logical 1 signal.

The recognition procedure performed by the apparatus has a "learn" mode and a measurement mode.

In its use in the "learn" mode, there will be applied, to the input ports 1a to 1n of the connection network 2, binary encoded data signals representing a pattern. The connection network 2 receives the binary data and rearranges it to provide a set of s binary digits for each group of its output ports connected to a storage block 3a to 3r. Each set of s binary digits is used as an address by the respective one of the storage blocks 3a to 3r and, with the respective addresses applied to the storage blocks 3a to 3r, "write" signals and logical 1 signals are applied to all of the storage blocks 3a to 3r, resulting in the writing of a logical 1 into one address only of each of the storage blocks 3a to 3r. Therefore, the input binary data representing the pattern has been transformed into a set of logical 1s held in the storage blocks 3a to 3r, there being a single logical 1 held in each one of the storage blocks 3a to 3r at an address that is related to that part of the input data that is able to control the addressing of the particular storage block. The "learning" phase of the procedure is completed once all the storage blocks addressed by binary input data 3a to 3r have been written to. All addresses not written to hold a logical 0.

In the measurement phase of the procedure, no "write" signals are applied to the storage blocks 3a to 3r and, instead, stored data may be read out from the storage blocks 3a to 3r.

In the measurement phase of the procedure, binary data representing a pattern, which may be the same as that "learnt" by the apparatus, is applied to the input ports 1a to 1n of the connection network 2. The binary data is transformed into digit groups by the connection network 2, the s-digit groups are applied to respective ones of the storage blocks 3a to 3r, and each of the storage blocks 3a to 3r is read The data signals resulting from the reading of the storage blocks 3a to 3r are applied to the logic blocks 4a to 4h which perform the logical AND operation on pairs of the output data signals from the storage blocks 3a to 3r, and the resulting logic signals are passed down the logic network, being halved in number at each column of logic blocks by virtue of being subjected, in pairs, to successive AND operations, until a single signal emerges from the final logic block, represented by the logic block 7.

At the time that the data signals are being processed by the logic network, the data signals leaving the storage blocks 3a to 3r are applied to the first summation network 8 which provides at its output port 13a, a total of the number of logical 1 signals passing out of the storage blocks 3a to 3r. Also, the second summation network 9 receives data signals leaving the logic blocks 4a to 4h and provides at its output port 13b, a total of the number of logical 1 signals passing out of the logic blocks 4a to 4h. The third summation network 10 is connected to the output ports of the logic blocks 5a to 5d and provides, at its output port 13c, a total of the number of logical 1 signals passing out of the logic blocks 5a to 5d, the fourth summation network 11 provides a total of the number of logical 1 signals passing out of the logic blocks 6a and 6b, and the fifth summation network 12 provides a total of the number of logical 1 signals at the logic block 7.

The logic block 7, and the summation network 12, provide a "yes/no" signal indicating whether or not a pattern under consideration is the same as the pattern which the system has "learnt", a "yes" signal being produced only when the pattern under consideration produces logical 1 signals from all the storage blocks.

In addition to the fact that the block 7 and the summation network 12 provide a signal indicating whether or not a pattern under consideration has been "recognised", the summation networks 8 to 11 provide summation results for the pattern which the system has "learnt" and the pattern under consideration, which summation results may be compared in further measuring apparatus. More specifically, if the summation results for the pattern which the system has "learnt" is set up, then all the storage blocks 3a to 3r will provide logic 1 output signals, and there will be logic 1 signals throughout the logic network. If, therefore, there are R storage blocks, the summation network 8 will provide an output total R, the summation network 9 will provide an output total R/2, the summation network 10 will provide an output total R/4, and so on, and that, the perfect summation result, may be represented graphically as a straight line with a slope of $-\frac{1}{2}$ and an initial value of R. Summation results of patterns under consideration could then be compared with the perfect summation profile as part of the assessment of whether or not a pattern under consideration is likely to be the pattern "learnt" by the system.

As a further recognition procedure, the apparatus may "learn" by being subjected to a sequence of several samples of a pattern it is required to recognise, resulting in the storage blocks 3a to 3r holding data that accommodates the variations that may be expected in a set of samples, and improving the chances that any further samples of the pattern taught to the system would be recognised correctly as being of that pattern, while patterns that should be rejected are rejected.

The apparatus described for carrying out the recognition procedure has been shown as having a logic network having five "layers", that is, providing five summations, but it will be understood that, in practice, there may be several tens or hundreds of "layers", which will provide highly characteristic summation "profiles".

Some of the characteristics of the recongition procedure, and the apparatus for performing the procedure, described above, are as follows:

1. The training procedure is simple, since it is a straightforward "address and write" system which is suitable for addressable memory devices.
2. There is a high immunity to noise since logical errors caused by noise are swamped by the large number of signals available.
3. There is some tolerance to failure of memory elements for the reason given at 2 above.
4. The system is capable of high-speed operation since it involves simple "address and write" and "address and read" operations along with logical AND operations and arithmetic summation.
5. High selectivity- is possible because selectivity depends on the number of addresses used for the storage blocks and the number of logic network "layers", and it is possible to provide substantial memory and logic capacity at relatively low cost.
6. There is a relatively low memory requirement because input data sets are each transformed to a single memory address. This feature leads readily to the possibility of multi-parameter input signals, for example, grey scale, colour, temporal or other data in binary form, being accommodated without the need for an extremely large memory.

Referring to FIG. 2 of the accompanying drawings, a second apparatus for carrying out the recognition procedure includes a system controller 100, control logic 101, an array mapping generator 102, address decoders 103 and 104, a data store 105, shift and latch logic 106, address counters 107 and 108, a memory block 109, a multilayer network 110, and a comparator 111.

Referring to FIG. 2, data derived from a subject to which the recognition procedure is to be applied is supplied to the data store 105 from which the data is read out under the control of the system controller 100, the array mapping generator 102, and the address decoders 103 and 104. The data read from the data store 105 is applied as a sequence of addresses to the memory block 109. The memory block 109 holds the reference data and provides a logical 1 only when its addressed cell holds a logical 1; otherwise, the memory block 109 provides a logical 0. The memory block !09 of FIG. 2 corresponds to the elements 3a to 3r of FIG. 1, and the output information from the memory block 109, which information is single-bit data, is subjected to the ANDing and summation processes described with reference to FIG. 1. The ANDing process is carried out, in FIG. 2, under the control of the system controller 100, by means of counters, latches, and logic elements which accept the single-bit data from the memory block 109, perform AND operations on pairs of the single-bit data, store each result, and repeat the sequence as many times as necessary to process the full set of data, the number of times the sequence is executed being recorded by the counters.

FIG. 3 of the accompanying drawings show in more detail the contents of the multi-layer network 110 of FIG. 2.

As shown in FIG. 3, the multilayer network includes a QR response counter 101, a tracking counter 1102, comparator logic 1103, a Q buffer latch 1104, an N-tuple response counter 1105, an amplitude normalisation shift register 1106, and a discriminator response latch 1107.

The operation of the recognition apparatus represented by FIGS. 2 and 3 may be understood more fully by reference to FIG. 4 of the accompanying drawings.

Referring to FIG. 4, the apparatus first executes an initialisation step S1 at which the counters are all cleared and the Q buffer latch is loaded. The data store is then loaded, at step S2, with data that the apparatus will learn or will classify, and, during steps S3 to S9, the apparatus extracts single bits of data from the data store 105, where each bit is provided by the application of a respective N-bit address to the data store 105. If, at S10, the apparatus is learning, the extracted data is used as an address to write logical a 1 into the memory block 109. If, at S10, the apparatus is being asked to examine a pattern, the extracted data is used as an address to read from the memory block 109. The apparatus then carries out step S11, which is shown in more detail in FIG. 5, during which, in the examination of a pattern, the data read from the memory block 109 is assessed, and the assessment continues only so long as only logical 1 values are obtained. The remaining steps of FIG. 4 relate to the housekeeping operations carried out with the assistance of counters in the performance of a full sequence of operations.

Referring to FIG. 5, following the step S10 of FIG. 4, tracking counters holding values QT and QR are clocked (step S112) after which the value QT is checked against a value Q, set originally in the buffer latch 1104 of FIG. 3, and those steps preceding step S112 are repeated until QT equals Q. Once QT is equal to Q (step S113) then all the data from one group of addresses has been examined. The apparatus then checks, at step S114, that only logical 1s have been found in the data examined (step S115), and, provided that only logical 1s have been found, then proceeds to check any unexamined data in the same way (steps S116 and S117).

Returning to FIG. 4, it is to be noted that, at step S3, the apparatus exercises the option of reading from the data store !05 by linear, ordered, or pseudo-random address mapping. The choice is provided in order to avoid "aliasing" between a pattern and its stored representation.

Referring to FIG. 6 of the accompanying drawings, a data store, as shown, capable of providing parallel output data may replace the single output bit data store 105 of FIG. 2 and its associated address decoders, as a means of speeding up the learning and recognition procedures.

Referring to FIG. 6, the alternative data store includes a controller 200, a line decoder 216, a line selector 218, an output latch 210, eight memories 201 to 208, and a word selector 210, connected together.

Referring to FIG. 6, serial four-bit data words are supplied on a bus 176 and are stored in the memories 201 to 208 in accordance with addresses received by the controller 200 on a bus 158. The line selector 218 selects one of the memories 201 to 208, and data is stored in the selected memory in accordance with an address supplied on a bus 212. An entire frame of data is stored in the memories 201 to 208 by the repeated procedure of selecting a memory and loading each of its addresses with data. When a frame is stored, eight data words, one from each of the first addresses of the memories, are obtainable for storage in the latch 210, and are obtainable as outputs from the latch in response to the application of the first address to the data store. Further data words are obtainable from the other addresses of the memories by the application of the appropriate address.

The data store shown in FIG. 6 has memories capable of storing 32 four-bit words, and either the capacity of each memory, or the number of memories, or both, ma be varied according to the desired frame storage capacity. A picture frame stored in the data store may be supplied in serial form by way of the word selector 230 on a bus 232 to a display device, or may be supplied to data processing equipment.

Referring to FIG. 7, apparatus 301 is used to transfer biometric data capable of characterising a person 300 on to an identity card 303. The identity card 303 includes a memory block which occupies the position of the memory block 109 of FIG. 2, and has written into it data such as that held by the memory block 109. A card writer 302 performs the writing operation Referring to FIG. 8, a person 300, wishing to be recognised, presents himself and his card 303 to the apparatus 301,304,305, which makes a biometric assessment of that person and uses the biometric assessment data as addresses, as described above, in reading data from the card 303 presented. The apparatus 301,304,305 makes an assessment as to recognition, as described above, according to whether only logical 1s are read from the card 303. If values other than logical 1s are read from the card 303, a secondary assessment as to the extent of similarity between the two sets of data, as described above, may be made.

Means may be provided to assist the user to properly positioned for the biometric determination to be carried out, in order to simplify the comparison operation and to allow the user to relax, thereby reducing the chances of producing a false negative result. For example, if facial characteristics are being determined, a two-way mirror may be used to conceal a camera, and the user instructed to position himself where he can see his reflection in the mirror.

It will be evident that the recognition apparatus acquires all the information it needs from the card presented to the apparatus and the person presenting that card. Use of the recognition method and apparatus according to the invention avoids, therefore, the need for the apparatus to be connected to a database containing details of the users. Advantages include faster reaction times, and greater flexibility in the installation of the apparatus.

Connection to a database is, however, not excluded, since other information may then be made available, but the invention avoids the need for database scanning required by other methods.

Examples of uses of the apparatus include the control of access to physical locations such as vehicles, buildings, or machines including computers and production control equipment. Financial transactions may be controlled at cash dispensers or at electronic point-of-sale devices, as may other transactions, including diplomatic and international transactions, such as passport control. The carrier may contain other information such as medical records.

The application of the procedure described above in the preparation of an identity card results in an identity card with less stored data than would be required for other proposed systems, for the same chances of a correct recognition result.

In apparatus in accordance with the present invention, the effective size N of the groups of addresses may be increased without a prohibitive increase in the memory requirement. With the multilayer arrangement, results equivalent to those for very large address sizes in singlelayer arrangements can be achieved with memory requirements not exceeding those for single-layer arrangements using 4-bit address groups (N=4). Experiment has shown that memory requirements are reduced by a factor of $Q^{*2}$ for an equivalent performance to that obtained from known techniques, where Q is the number of memory elements in a system without AND operations.

The techniques may be described as follows:

In "Standard N" techniques the positive output from the comparison of each memory element is counted and recognition is said to have been achieved when the count passes a certain percentage of the whole.

In the present technique (The Pseudo Huge N technique) the outputs from a number Q memory elements are ANDed and the result is output to a counter. (Thus if Q=4 and all 4 memory elements gave a logical 1 result, a logical 1 would be output to the counter. However, if any one of the memory elements failed to give a logical 1 output, there would be no output).

So that the count may be normalised with a count using a different value of Q, the value of the count output is shifted right (in the direction of the Most Significant Digit in binary) by a factor of $\log_2 Q$.

We claim:

1. A recognition procedure including the steps of teaching a reference pattern to a machine-based recognition system by writing a first binary digit to each of a plurality of addressable data stores, each of which has a plurality of addressable data storage locations, at locations selected by applying respective sets of values as addresses to the addressable data stores, where the sets of values represent characteristics of parts of the reference pattern, writing a second binary digit to all locations not selected in the addressable data stores, and of measuring another pattern against the reference pattern by applying, as addresses, to the addressable data stores, sets of values representing characteristics of parts of the other pattern, where the parts correspond to the said parts of the reference pattern, reading the contents of those locations selected, applying the binary digits read from the selected locations to a network that provides an output signal representing one binary digit as its output only when the first binary digit is obtained from each selected location, and which provides an output signal representing the other binary digit if one second binary digit is obtained from the selected locations, forming at least one sum of the total number of occurrences of the first binary digit at selected positions within the network, and providing a result signal indicating the result of the measurement, where the result signal is determined by the output signal from the network and the sum of the total number of occurrences of the first binary digit at selected positions within the network.

2. A recognition procedure as claimed in claim 1, wherein the first binary digit is a logical 1, and the network for providing the output signal is a network of logical AND gates.

3. A recognition procedure as claimed in claim 1, wherein the first binary digit is a logical 1, and the network includes a logic element capable of performing an AND operation on values presented to it, associated latches for storing respective input and output values for the logic element, and counters for controlling the grouping, and circulation, of successive input and output values, through the logic element, in group sizes, and for a number of times, as set by initial settings of the counters.

4. A recognition procedure as claimed in claim 1, which includes the steps of forming a sum of the total number of times that the first binary value is read from the addressable data stores during the measuring of the other pattern against the reference pattern, and taking the total number into account in providing an output signal indicating the result of the measurement.

5. A recognition procedure as claimed in claim 4, including the steps of forming sums of the total number of occurrences of the first binary value at selected positions within the network and taking those further sums into account in providing an output signal indicating the result of the measurement 6. A recognition procedure as claimed in claim 1, wherein the values representing characteristics of the reference pattern are encoded for application to the addressable data stores, and the encoding algorithm is different for each reference pattern.

7. A recognition procedure as claimed in claim 1, wherein the reference pattern relates to a human face.

8. A recognition procedure as claimed in claim 1, wherein the reference pattern is written to addressable data stores located in a machine-readable data carrier.

9. A recognition procedure as claimed in claim 1, which comprises making a pattern from a biometric determination of a person to be identified, reading a machine-readable data carrier having a reference pattern made from the same biometric determination of a person, comparing the two patterns, and indicating the identity or otherwise of the two patterns.

10. An apparatus for carrying out a recognition procedure in which a reference pattern is memorized and a pattern to be examined is compared with the reference pattern, including:
a plurality of addressable data stores each having a plurality of addressable data storage locations, address ports, data input and output ports, and a read/write control port,
input means for receiving input values representing characteristics of a pattern to be memorized or examined and for presenting the input values as a plurality of sets of values to the address ports of respective ones of the addressable data stores,
a network of logic elements connected to the data output ports of the addressable data stores, the network being such as to provide one binary digit as its output only when a first binary digit is obtained from each data output port of the addressable data stores, and to provide the other binary digit if one second binary digit is obtained from the data output ports, and,
summation means connected to selected groups of logic elements in the network of logic elements for forming at least one total of the number of times the first binary digit appears at selected positions of the logic network,
the apparatus being operable, when a pattern is being memorized,
to load one location of each addressable data store with a first binary digit and to load all other locations with a second binary digit, where the locations that receive the first binary digit are selected by respective sets of the input values representing the characteristics of parts of the pattern being memorized, and
when a pattern is being examined,
to read the contents of one location of each addressable data store, where the locations that are read are selected by respective sets of the input values representing the characteristics of parts of the pattern being examined, where the parts correspond to the said parts of the memorized pattern,
to apply the data read from the addressable data stores to the network of logic elements, and,
to provide a result signal determined by the output signal from the network of logic elements and the output of the summation means.

11. An apparatus as claimed in claim 10, wherein the logic network consists of a cascade of groups of AND gates, in which the number of AND gates in each group is half the number of AND gates in the immediately preceding group.

12. An apparatus as claimed in claim 10, including a summation means for forming a sum of the total number of times that the first binary value is read from the addressable data stores during the examination of a pattern.

13. An apparatus as claimed in claim 12, including first summation means connected to the data output ports of the addressable data stores.

14. An apparatus as claimed in claim 13, including further summation means connected to selected groups of logic elements in the network of logic elements for forming further totals of the number of times the first binary value appears at selected parts of the logic network.

15. An apparatus as claimed in claims 10, wherein the input means is capable of encoding the input values for application to the addresses of the addressable data stores, and is capable of changing its encoding algorithm.

16. An apparatus as claimed in claims 10, which is capable of accepting a machine-readable data carrier in which is memorised a reference pattern relating to human biometric characteristics, of generating, as input values, values representing biometric characteristics of a subject presented for examination, and of performing the recognition procedure on the reference and generated biometric characteristics.

17. An apparatus as claimed in claims 10, including means for making a biometric determination, means for encoding the biometric determination, and means for applying the encoded data to a machine-readable data carrier.

18. A machine-readable data carrier, produced by an apparatus as claimed in claim 17, including a plurality of addressable data stores, holding a reference pattern relating to human biometric characteristics.

* * * * *